US009870072B2

(12) United States Patent
Lee et al.

(10) Patent No.: US 9,870,072 B2
(45) Date of Patent: Jan. 16, 2018

(54) TOUCH DEVICE STRUCTURE HAVING THROUGH HOLES

(71) Applicant: LG INNOTEK CO., LTD., Seoul (KR)

(72) Inventors: Sun Hwa Lee, Seoul (KR); Seong Su Oem, Seoul (KR); Dae Young Ku, Seoul (KR); Young Sun You, Seoul (KR); Jee Heum Paik, Seoul (KR); Hyo Won Son, Seoul (KR); Eun Young Jung, Seoul (KR); Kwang Yong Jin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 48 days.

(21) Appl. No.: 14/633,691

(22) Filed: Feb. 27, 2015

(65) Prior Publication Data

US 2015/0248184 A1    Sep. 3, 2015

(30) Foreign Application Priority Data

Mar. 3, 2014 (KR) .................. 10-2014-0025242
Apr. 28, 2014 (KR) .................. 10-2014-0050954
May 26, 2014 (KR) .................. 10-2014-0063266

(51) Int. Cl.
*G06F 3/0354* (2013.01)
*G06F 3/046* (2006.01)
*G06F 3/047* (2006.01)

(52) U.S. Cl.
CPC .......... *G06F 3/03545* (2013.01); *G06F 3/046* (2013.01); *G06F 3/047* (2013.01); *G06F 2203/04103* (2013.01); *G06F 2203/04104* (2013.01)

(58) Field of Classification Search
CPC .......... G06F 3/044; G06F 3/045; G06F 3/042; H01L 27/323; H01L 51/5246
See application file for complete search history.

(56) References Cited

U.S. PATENT DOCUMENTS

| | | | | |
|---|---|---|---|---|
| 2010/0182272 | A1* | 7/2010 | Kang | G06F 3/044 345/174 |
| 2011/0304579 | A1* | 12/2011 | Feng | G06F 3/044 345/174 |
| 2012/0037916 | A1* | 2/2012 | Song | H01L 27/323 257/72 |
| 2012/0098781 | A1* | 4/2012 | Kim | G06F 3/044 345/174 |
| 2012/0211264 | A1* | 8/2012 | Milne | G06F 3/044 174/250 |
| 2013/0249871 | A1 | 9/2013 | Yoo et al. | |

(Continued)

FOREIGN PATENT DOCUMENTS

| | | |
|---|---|---|
| KR | 10-2009-0106208 A | 10/2009 |
| KR | 10-2013-0107886 A | 10/2013 |

*Primary Examiner* — Sepehr Azari
(74) *Attorney, Agent, or Firm* — KED & Associates, LLP

(57) ABSTRACT

A digitizer includes a first substrate, a first electrode on the first substrate, a first insulating layer on the first electrode, and a second electrode on the first insulating layer. The first insulating layer is formed therein with a through hole to expose the first electrode, and the first and second electrodes make contact with each other through the through hole.

20 Claims, 7 Drawing Sheets

(56) References Cited

U.S. PATENT DOCUMENTS

2013/0328808 A1\* 12/2013 Cho ................. G06F 3/0412
          345/173
2014/0022466 A1\* 1/2014 Lo ..................... G06F 3/044
          349/12

\* cited by examiner

TOUCH DEVICE STRUCTURE HAVING THROUGH HOLES

CROSS-REFERENCE TO RELATED APPLICATIONS

This application claims priority under 35 U.S.C. §119 to Korean Application Nos. 10-2014-0025242 filed on Mar. 3, 2014, 10-2014-0050954 filed on Apr. 28, 2014 and 10-2014-0063266 filed on May 26, 2014, whose entire disclosures are incorporated herein by reference.

BACKGROUND

1. Field

The embodiment relates to a digitizer.

2. Background

Recently, a touch panel, which performs an input function through the touch of an image displayed on a display device by an input such as a stylus pen or a finger has been applied to various electronic appliances. An electromagnetic resonance (EMR) scheme, which is one of input schemes of the stylus pen, has been extensively used. According to the EMR scheme, a loop coil is provided on a printed circuit board, a voltage is applied to the loop coil so that power is transmitted. Accordingly, the generation of an electro-magnetic wave can be controlled due to the transmitted power, and the generated electromagnetic wave can be absorbed into an EMR pen. In this case, the EMR pen may include a capacitor and a loop, and the absorbed electromagnetic wave may be radiated at a predetermined frequency.

The electromagnetic wave radiated from the EMR pen may be absorbed by the loop coil of the printed circuit board so that the position of the EMR pen close to the touch screen can be determined. According to the EMR scheme, an electrode may be formed on the printed circuit board. Accordingly, electrodes may be formed on one surface or both surfaces of the printed circuit board due to the characteristic of the printed circuit board. However, in order to connect the electrodes formed on both surfaces of the printed circuit board with each other, a process of forming a hole in the printed circuit board is essentially required. As the manufacturing process is complicated, and the manufacturing cost is increased, the process efficiency may be degraded.

BRIEF DESCRIPTION OF THE DRAWINGS

The embodiments will be described in detail with reference to the following drawings in which like reference numerals refer to like elements wherein.

DETAILED DESCRIPTION

Figure 1:
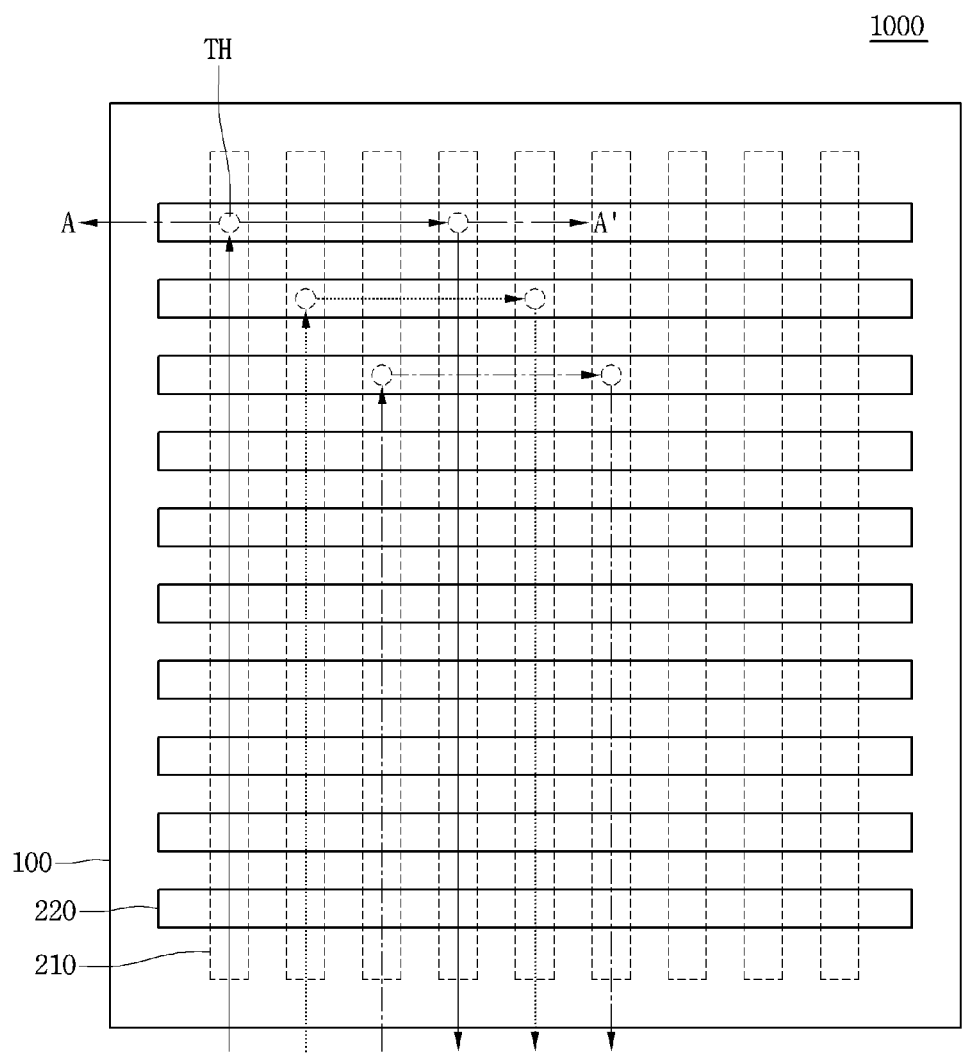
FIG. 1 is a plan view showing a digitizer according to the embodiment.
Figure 2:
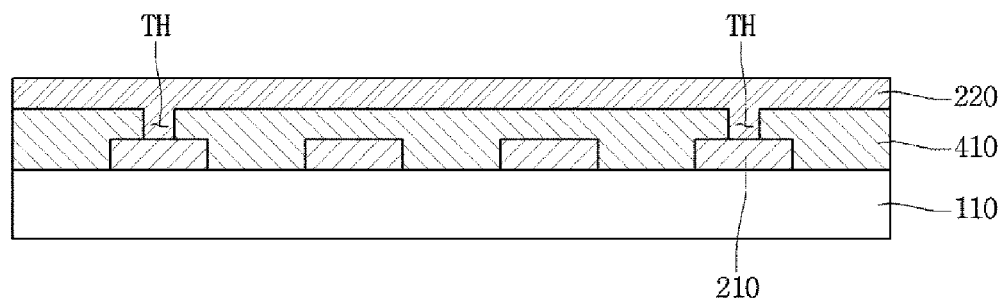
FIG. 2 is a sectional view showing a digitizer according to the first embodiment, which is taken along line A-A' of FIG. 1.
Figure 3:
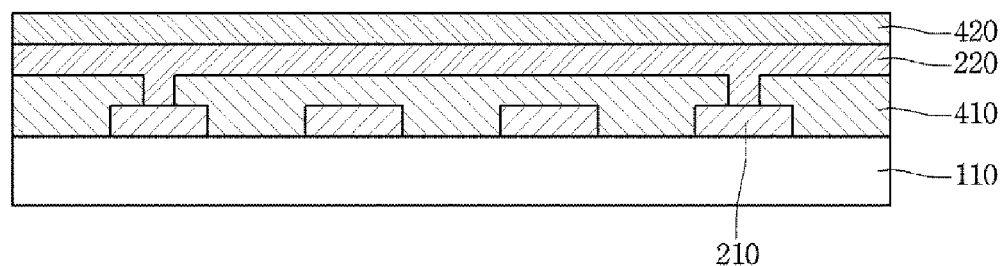
FIGS. 3 to 6 are sectional views showing other examples of the digitizer according to the first, which is taken along line A-A' of FIG. 1.
Figure 4:
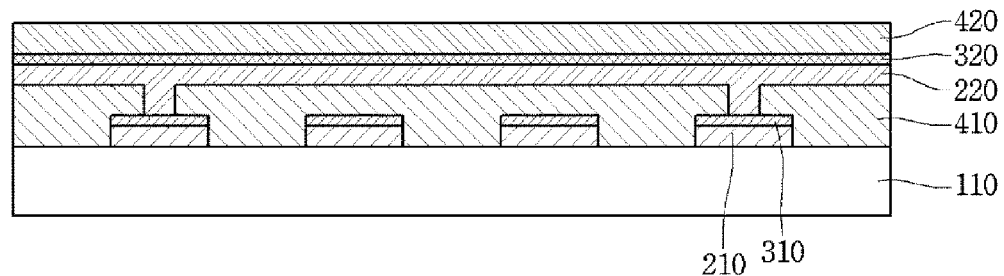

Referring to FIG. 1, a digitizer according to the embodiment may include a substrate, an electrode, and an insulating layer. A substrate 100 may support the electrode and the insulating layer. The substrate 100 may include plastic. For example, the substrate 100 may include plastic such as polyethylene terephthalate (PET) or polyimide (PI). The substrate 100 may also include at least one or two substrates. For example, the substrate may include only a first substrate 110 or both of the first substrate 110 and a second substrate 120.

Referring to FIGS. 2 to 10, the digitizer according to the first embodiment may include the first substrate 110. The first substrate 110 may include plastic. For example, the first substrate 110 may include polyethylene terephthalate (PET) or polyimide (PI). The electrode may be provided on the first substrate 110. The electrode may include a first electrode 210 and a second electrode 220.

The first electrode 210 may make contact with the first substrate 110. In detail, the first electrode 210 extends in a first direction, and may be provided on the first substrate 110. The first electrode 210 may include a conductive material. The first electrode 210 may include a metallic material. For example, the first electrode 210 may include at least one of metals including gold (Au), silver (Ag), copper (Cu), molybdenum (Mo), nickel (Ni), and chromium (Cr). For example, when the first substrate 110 includes PET, the first electrode 210 may include Ag. In addition, when the first substrate 110 includes PI, the first substrate 110 may include Cu.

The first electrode 210 may have a predetermined thickness. For example, the first electrode 210 may be formed at a thickness in the range of about 9 μm to about 50 μm. If the thickness of the first electrode 210 is less than about 9 μm, the electrical characteristic of the first electrode 210 may be degraded. If the thickness of the first electrode 210 exceeds about 50 μm, the thickness of the digitizer may be increased.

The first electrode 210 may be patterned so that the first electrode 210 may include a plurality of first unit electrodes. When the first substrate 110 includes PET, the first electrode 210 including a plurality of first unit electrodes may be provided on the first substrate 110 by using a conductive paste. Further, when comparing with the case of using the conductive paste, the substrate can be prevented from being deformed or damaged due to the application of heat or pressure on the substrate.

When the first substrate 110 includes PI, after providing metal, for example a Cu layer on the first substrate 110, a mask is provided on the resultant structure, and then the first electrode 210 including the first unit electrodes may be provided on the first substrate 110 through an exposure and development process and an etching process.

A metallic layer may be further provided on the first electrode 210. The first metallic layer 310 may include at least one of metals including nickel (Ni), copper (Cu), and chromium (Cr). The first metallic layer 310 may be provided on the first electrode through an electroplating process or an electroless plating process.

The first metallic layer 310 may have the thickness in the range of about 1 μm to about 10 μm. If the thickness of the first metallic layer 310 is less than about 1 µm, resistance is increased, so that the electrical characteristic may be lowered. If the thickness of the first metallic layer 310 exceeds about 10 µm, the thickness of the digitizer may be increased, and the process efficiency may be lowered.

The insulating layer may be provided on the electrodes. The insulating layer may include a first insulating layer 410 and a second insulating layer 420. The first insulating layer 410 may be formed through a printing process. The first insulating layer 410 may include an insulating resin such as acryl.

The first insulating layer 410 may be provided on the first electrode 210. The first insulating layer 410 may be provided while surrounding the first electrode 210. The first insulating layer 410 may be formed therein with a through hole TH formed through the first insulating layer 410.

When printing the first insulating layer 410, the first insulating layer 410 may be selectively printed except for a region of the through hole TH, so that a plurality of through holes TH may be formed in the first insulating layer 410. Alternatively, after printing the first insulating layer 410 on an entire surface of the first electrode 210, the first insulating layer 410 may be partially etched to form the through holes TH.

The first electrode 210 provided on the first substrate 110 may be exposed through the through hole TH. In other words, the through hole TH may be formed in a region corresponding to a region in which the first electrode 210 is provided. The first electrode 210 provided on the first substrate 110 may be partially covered with the first insulating layer 410, and may be partially exposed through the through hole TH. The second electrode 220 may be provided on the first insulating layer 410. The second electrode 220 may extend in a second direction on the first insulating layer 410. The second electrode 220 may extend in a direction different from a direction of the first electrode 210.

Although FIG. 1 shows that the first electrode 210 is vertically provided, and the second electrode 220 is horizontally provided, the embodiment is not limited thereto. The first electrode 210 and the second electrode 220 may be provided in various directions if the first and second electrodes 210 and 220 are provided in directions crossing each other. For example, the first electrode 210 may be horizontally provided, and the second electrode 220 may be vertically provided.

The second electrode 220 may be provided while passing through the first insulating layer 410. In other words, the second electrode 220 may be provided while crossing the first electrode 210, and may be provided while pasting through the first insulating layer 410 having the through hole TH. Therefore, at the region where the second electrode 220 passes through the through hole TH, the first electrode 210 may make contact with the second electrode 220.

The second electrode 220 may include a conductive material. For example, the second electrode 220 may include a metallic material. The second electrode 220 may include a material the same as or similar to a material constituting the first electrode 210. For example, the first and second electrodes 210 and 220 may include metal the same as or similar to at least one of Au, Ag, Cu, Mo, Ni, and Cr. The second electrode 220 may be provided through a process the same as or similar to that of the first electrode 210.

The second electrode 220 may have a predetermined thickness. For example, the second electrode 220 may be formed at a thickness in the range of about 9 µm to about 50 µm. In detail, the second electrode 220 may have a thickness equal to or different from the thickness of the first electrode 210 in the range. If the thickness of the second electrode 220 is less than about 9 µm, the electrical characteristic of the second electrode 220 may be degraded. If the thickness of the second electrode 220 exceeds about 50 µm, the thickness of the digitizer may be increased.

A metallic layer may be further provided on the second electrode 220. In other words, the second metallic layer 320 including metal may be further provided on the second electrode 220. The second metallic layer 320 may include at least one of metals including Ni, Cu, and Cr. The second metallic layer 320 may be provided on the second electrode through an electroplating process or an electroless plating process.

The second metallic layer 320 may have the thickness in the range of about 1 µm to about 10 µm. If the thickness of the second metallic layer 320 is less than about 1 µm, resistance is increased, so that the electrical characteristic may be lowered. If the thickness of the second metallic layer 320 exceeds about 10 µm, the thickness of the digitizer may be increased, and the process efficiency may be lowered.

The first electrode 210 and the second electrode 220 are connected with each other through the through hole, and a loop-shaped electrode may be totally realized. In detail, as shown in an arrow of FIG. 1, an electrode extends in a first direction, in which the first electrode 210 extends, and makes contact with the second electrode 220 at the region of the through hole TH. In addition, the electrode extends in a second direction, in which the second electrode 220 extends, from the contact region and makes contact with the first electrode 210 at the region of the through hole TH. In addition, the electrode may extend in the first direction in which the first electrode 210 extends from the contact region.

The first electrode 210 and the second electrode 220 may make contact with each other at the region of the through hole TH so that the first electrode 210 and the second electrode 220 may be totally realized as a loop-shaped electrode. The electrode including the first electrode 210 and the second electrode 220 may include a loop-shaped coil.

When an electromagnetic touch object, for example a digitizer pen, is touched on one surface of a display device including the digitizer, a signal generated from a resonance circuit included in the digitizer pen is recognized by a touch sensor so that the position of the digitizer pen can be detected.

Power is transmitted to the loop-shaped coil including the first electrode 210 and the second electrode 220 to generate an electromagnetic wave, and the electromagnetic wave is absorbed into the digitizer pen. The electromagnetic wave absorbed into the digitizer pen is discharged at a predetermined frequency. The touch sensor detects the electromagnetic variation occurring according to the approach of the digitizer pen, so that the position of the digitizer pen can be detected.

The second insulating layer 420 may be further provided on the second electrode 220. The second insulating layer 420 may be formed through a printing process. The second insulating layer 420 may include an insulating resin such as acryl.

The second insulating layer 420 is provided on the second electrode 220 to serve as a protective layer to protect the second electrode 220 from an outside.

Figure 5:
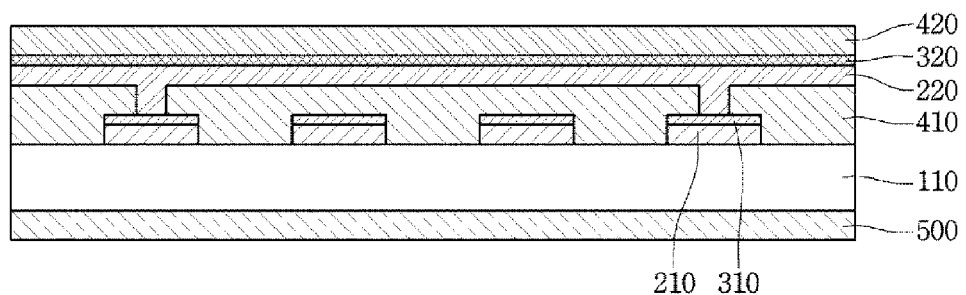

Referring to FIG. 5, a shielding layer 500 may be further formed on the first substrate 110. The above-described electrode and insulating layer may be formed on the one surface of the substrate 100, and the shielding layer 500 may be further formed on an opposite surface of the first substrate 110 opposite to the one surface.

The shielding layer 500 may be formed by directly printing a shielding material on the opposite surface of the first substrate 110 and curing the shielding material.

Figure 6:
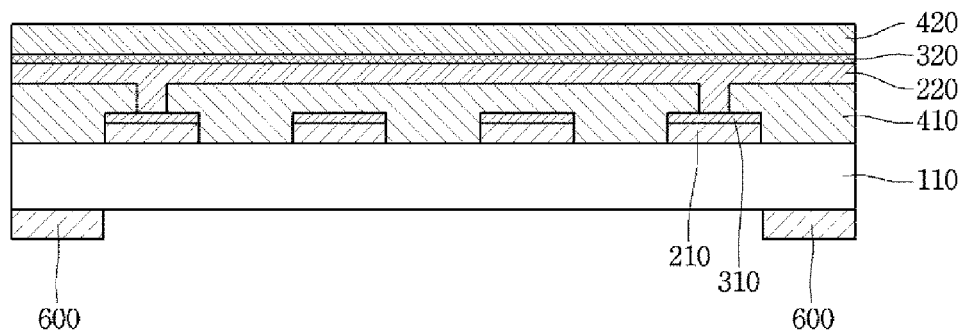

Referring to FIG. 6, a ground electrode 600 may be further formed on the opposite surface of the first substrate 110. In other words, at least one of functional layers including the shielding layer 500 and the ground electrode 600 may be further provided on the opposite surface of the first substrate 110.

The digitizer according to the first embodiment can be easily fabricated, so that the process efficiency can be improved.

Generally, a process of forming a through hole in a polyimide substrate is required in order to connect the first and second electrodes with each other after forming first and second electrodes on both surfaces of the polyimide substrate by patterning copper layers plated on both surfaces of the polyimide substrate.

Accordingly, according to the related art, a digitizer is fabricated using an FPCB scheme to form the first and second electrodes on the both surfaces. However, according the scheme of the related art, the realizing of a large-size digitizer is difficult. In addition, the process of forming the through hole is required so that the process efficiency may be degraded, and a substrate such as the polyimide substrate is required so that the process cost may be increased.

The digitizer according to the embodiment may be fabricated by using a substrate including PET, forming the first and second electrodes on one surface of the substrate, and selectively printing the insulating layer to form a through hole in the insulating layer in order to connect the first and second electrodes with each other.

According to the digitizer of the embodiment, both of the first and second electrodes may be formed on one surface, and the substrate including PET is used, so that a large-size digitizer can be realized and the process cost can be reduced. In addition, the insulating layer is selectively printed to form a through hole to connect the first and second electrodes with each other. Accordingly, the process of forming the through hole can be omitted, so that the process efficiency can be improved.

In addition, the first and second electrodes are realized on one surface of the substrate, so that functional layers including a shielding layer and a ground electrode may be further formed on an opposite surface of the substrate. In particular, the shielding layer may be formed by directly printing and curing a shielding material on the opposite surface of the PET substrate. Accordingly, the shielding material electrode sheet may be integrated with a shielding sheet. When comparing with the case of forming a PET sheet on a conventional polyimide substrate, and printing and curing the shielding material on the PET sheet, the process cost can be reduced, and the process efficiency can be improved.

Figure 7:
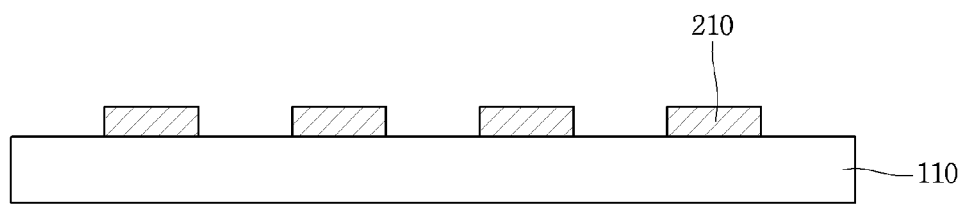
FIGS. 7 to 10 are sectional views to explain a method of fabricating the digitizer according to the first embodiment.

A method of fabricating the digitizer according to the first embodiment will be described with reference to FIGS. 7 to 10. Referring to FIG. 7, the first electrode 210 may be formed on the first substrate 110. The first electrode 210 may be formed by printing a metallic paste on the first substrate 110. An Ag paste may be printed through a printing process, such as a screen printing process, an inkjet process, an aero jet process, a direct printing process, or a gravure offset process, to form the first electrode.

Thereafter, a metallic layer may be formed on the first electrode 210. For example, Cu, Ni, or Cr may be plated on the first electrode 210. As the metallic layer is formed by plating metal on the first electrode 210, the resistance of the first electrode 210 may be reduced.

Figure 8:
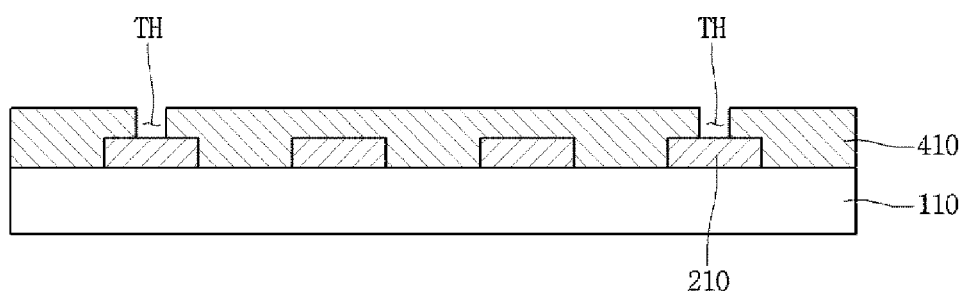

Referring to FIG. 8, the first insulating layer 410 may be formed on the first electrode. The first insulating layer 410 may be printed on the first electrode 210 through at least one of the above-described various printing processes. The first insulating layer 410 may be printed while partially covering the first electrode 210.

For example, the first insulating layer may be formed while the through hole TH to partially expose the first electrode 210 is formed. When the first insulating layer 410 is printed, the first insulating layer 410 may be selectively and partially printed, so that the first insulating layer 410 may be printed while the through hole TH to expose the first electrode 210 is formed.

Figure 9:
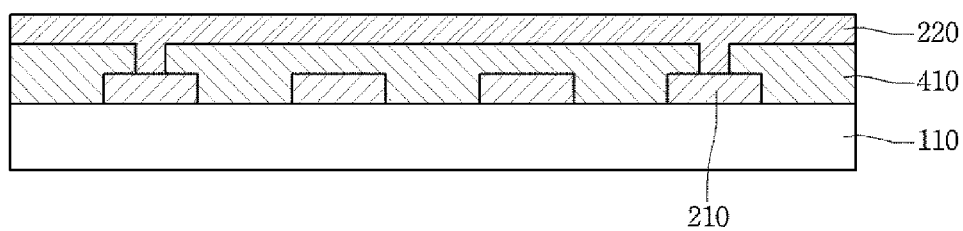

Referring to FIG. 9, the second electrode 220 may be formed on the first insulating layer 410. The second electrode 220 may be formed by printing an Ag paste similarly to the first electrode 210. The second electrode 220 may be formed while filling the through hole of the first insulating layer 410. Accordingly, the first electrode 210 may make contact with the second electrode 220 through the through hole TH.

Figure 10:
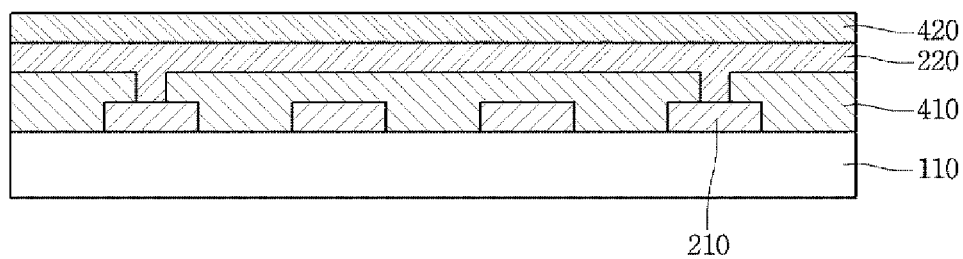

Referring to FIG. 10, the second insulating layer 420 may be formed on the second electrode 220. The second insulating layer 420 may be printed on the second electrode 220 through at least one of the above-described various printing processes.

A digitizer according to the second embodiment will be described with reference to FIGS. 11 to 17. The details of structures and the elements the same as or similar to those of the digitizer according to the first embodiment described above will be omitted, and the same reference numerals will be assigned to the same elements.

Referring to FIGS. 11 to 17, the digitizer according to the second embodiment may include a first substrate 110, a first electrode 210, a second electrode 220, a first metallic layer 310, and a second metallic layer 320. The first substrate 110 may include plastic. For example, the first substrate 110 may include polyethylene terephthalate (PET) or polyimide (PI).

The electrode may be provided on the first substrate 110. For example, the first electrode 210 and the second electrode 220 may be provided on the first substrate 110. The first electrode 210 may make contact with the first substrate 110. For example, the first electrode 210 may directly or indirectly make contact with the first substrate 110.

Figure 11:
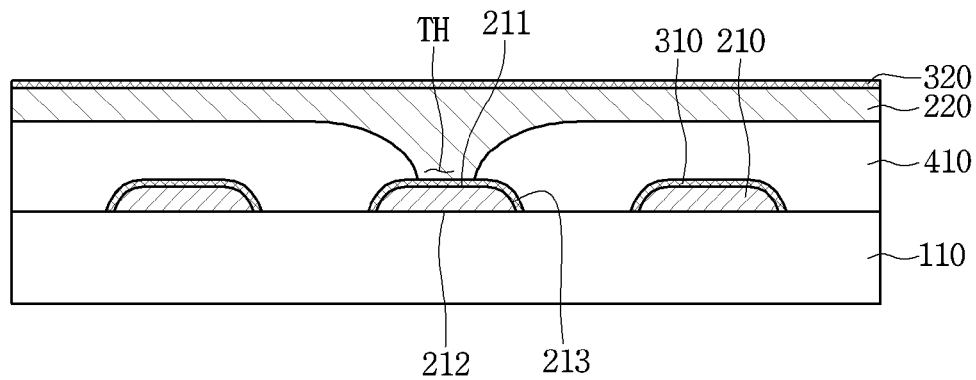
FIG. 11 is a sectional view showing a digitizer according to the second embodiment, which is taken along line A-A' of FIG. 1.
Figure 12:
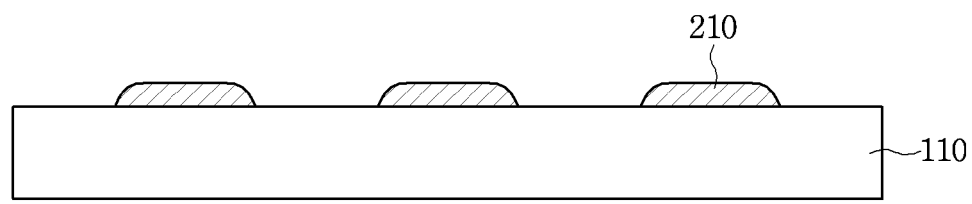
FIGS. 12 to 16 are sectional views to explain a method of fabricating the digitizer according to the second embodiment.
Figure 13:
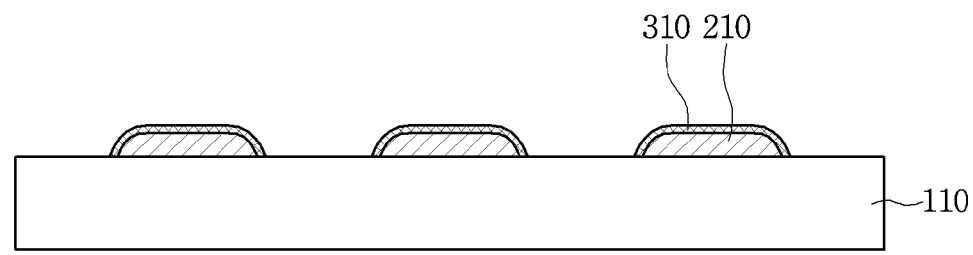

At least one surface of the first electrode 210 may include a curved surface. As shown in FIG. 11, a top surface 211 of the first electrode 210 may be entirely formed in a curved shape. The first electrode 210 may be provided with mutually different widths at the top surface 211 and a bottom surface 212 thereof. The top surface 211 of the first electrode 210 may have a width narrower than a width of the bottom surface 212 of the first electrode 210. A width of one surface of the first electrode 210 making contact with the first substrate 110 may be narrower than a width of an opposite surface opposite to the one surface of the first electrode 210.

The first metallic layer 310 may be provided on the first electrode 210. The first metallic layer 310 may be provided while surrounding the first electrode 210. The first metallic layer 310 may be provided on the entire surface of the first electrode 210. For example, when the top surface and the lateral side of the first electrode 210 are exposed to the outside, the first metallic layer 310 may be provided on the top surface 211 and a lateral side 213 of the first electrode 210.

The first metallic layer 310 may include a conductive material. The first metallic layer 310 may be formed through a printing process or a deposition process. The first electrode 210 and the first metallic layer 310 may include materials corresponding to each other. The first electrode 210 and the first metallic layer 310 may include materials different from each other.

The printing process refers to a process of forming an upper electrode layer 202 by printing conductive ink or a conductive paste through a printing process, such as a screen printing process, an inkjet process, an aero jet process, a direct printing process, or a gravure offset process.

The conductive ink is generally a material formed by dispersing a conductive material having a diameter in the range of several nano-meters (nm) to several micro-meters (um) and dispersed in a solvent. After printing the conductive ink on the first electrode 210, the resultant structure is heated at a predetermined temperature. In this case, an organic additive, such as a dispersing agent, is volatilized and an air gap between the conductive materials is contracted and sintered, thereby forming conductors electrically and mechanically connected with each other.

The conductive ink may be fabricated by re-dispersing conductive particles of a nano-size or micro-size material having electric conductivity in a polar or non-polar solvent together with capping molecules and additives. In this case, the conductive particles may include metallic nano-particles. For example, the conductive particles may include one selected from the group consisting of Ag, Cu, Au, and the combination thereof.

The metallic nano-particles include ceramic particles or organic molecules. If the metallic nano-particles are capped, the metallic nano-particles are prevented from being oxidized and prevented from being agglomerated with each other, and can constantly maintain resistivity even in sintering or in the contact with air. In addition, the conductive ink may further include other additives, such as an organic solvent, a binder, a dispersant, a thickener, and a surfactant.

In general, the conductive paste is a material obtained by dispersing conductive particles having a diameter in the range of several nano-meters (nm) to several micro-meters (um) in a resin having an adhesive property. The conductive paste is printed on the first electrode 210, and heated at a predetermined temperature. In this case, the resin is cured, and the electrical and mechanical contact between the metallic particles is fixed, thereby forming a conductor.

The conductive paste includes conductive particles having electric conductivity. For example, the conductive particle may include one selected from the group consisting of Ag, Cu, Au, and the combination thereof. The conductive particle may have various shapes. For example, the conductive particle may have the shape of a plate, a fiber shape, a nano-particle, and a nano-tube. A single nano-particle or the combination of the nano-particles may be used.

The conductive paste may additionally include a binder to improve the adhesive strength with the substrate. The conductive paste may include other additives including pigments, such as Ag powders, a solvent, a dispersing agent, a coupling agent, and a viscosity controlling agent, The deposition process refers to a process of forming the upper electrode layer 202 by depositing a metallic oxide layer. In this case, the metallic oxide layer may include a copper oxide layer (CuOx) or a silver oxide layer (AgOx). When the first metallic layer 310 includes the metallic oxide layer, since the metallic oxide layer surrounds the entire surface of the first metallic layer 310, the first electrode 210 can be prevented from being effectively prevented.

Although drawings show that the first metallic layer 310 is shown as a single layer, the first metallic layer 310 may be provided in multiple layers including at least two layers. The first metallic layer 310 may protect the first electrode 210 from being oxidized. In addition, as the first metallic layer 310 is provided, the electrical characteristic of the digitizer may be improved.

The first electrode 210 may have a curved surface, so that the first metallic layer 310 may be easily printed on the first electrode 210. Accordingly, the first metallic layer 310 may be provided on the entire surface of the first electrode 210.

Figure 14:
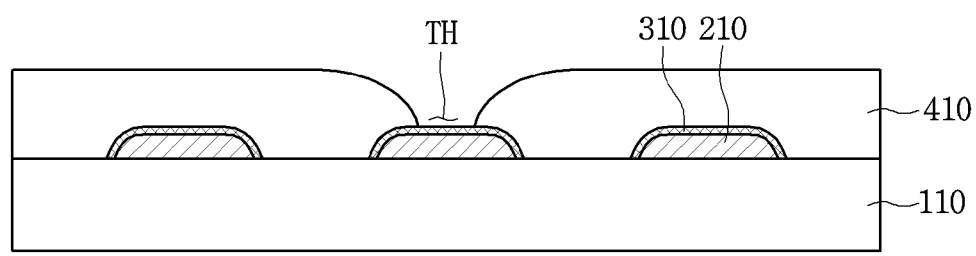

Referring to FIG. 14, the first insulating layer 410 may be provided on the first substrate 110 having the first metallic layer 310. The first insulating layer 410 may be formed through the printing process. The first insulating layer 410 may include an insulating resin such as acryl. The first insulating layer 410 may be provided on the first electrode 210 and the first metallic layer 310. The first insulating layer 410 may be provided while surrounding the first metallic layer 310.

The through hole TH may be formed through the first insulating layer 410. For example, when the first insulating layer 410 is printed, the first insulating layer 410 may be selectively printed except for the region of the through hole TH, so that a plurality of through holes TH may be formed in the first insulating layer 410.

The first metallic layer 310 provided on the first substrate 110 may be exposed through the through hole TH. In other words, the through hole TH may be formed at a region corresponding to the regions in which the first electrode 210 and the first metallic layer 310 are provided. The first metallic layer 310 provided on the first metallic layer 310 and on the first substrate 110 are partially covered by the first insulating layer 410, and partially exposed through the through hole TH.

Figure 15:
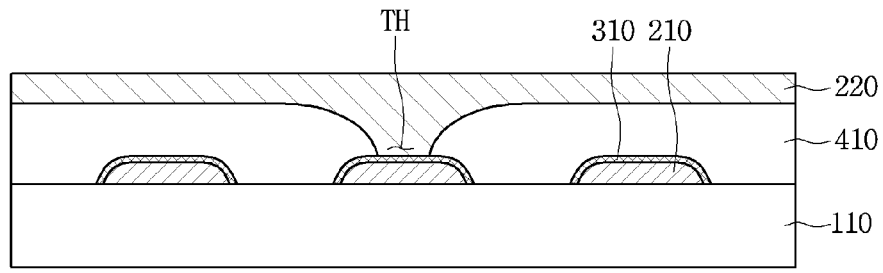
Figure 16:
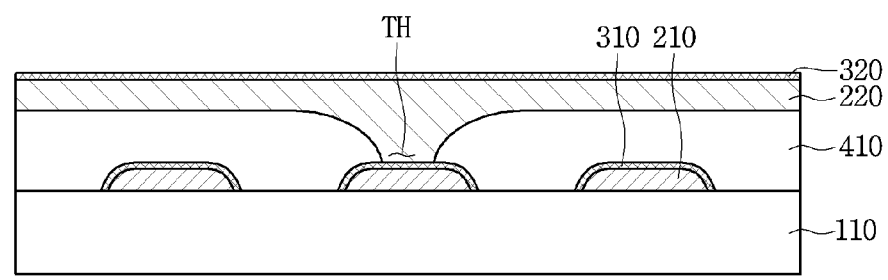

Referring to FIGS. 15 and 16, the second electrode 220 and the second metallic layer 320 may be provided on the first insulating layer 410. In other words, the second electrode 220 and the second metallic layer 320 may be provided on the first insulating layer 410 having the through hole TH.

The second electrode 220 may include a material the same as or similar to that of the first electrode 210, and may be provided in a process the same as or similar to that of the first electrode 210. The second metallic layer 320 may include a material the same as or similar to that of the first metallic layer 310, and may be provided in a process the same as or similar to that of the first metallic layer 310.

The second electrode 220 may directly or indirectly make contact with the first electrode 210 through the through hole TH of the first insulating layer 410. Accordingly, the first electrode 210 and the second electrode 220 may be connected with each other at the region where the through hole TH is formed. Although not shown, a second insulating layer may be further provided on the second metallic layer 320. In addition, the first substrate 110 may be provided on an opposite surface thereof with at least one of function layers including the shielding layer or the ground electrode.

The digitizer according to the second embodiment and the method of fabricating the same can be easily accomplished, so that the process efficiency can be improved. In other words, the digitizer according to the second embodiment may be fabricated by providing a first electrode including an upper electrode layer and a lower electrode layer on one surface of a substrate, and connecting the first and second electrodes with each other through the through hole.

In the digitizer according to the second embodiment and the method of fabricating the same, a plastic substrate including PET is used, so that a large-size digitizer can be realized and the process cost can be saved. In addition, the insulting layer can be selectively printed to form a hole to connect the first and second electrodes with each other. Accordingly, an additional process of forming the hole may be omitted. In addition, a conventional process of forming a through hole of a substrate in order to connect electrodes formed on both surfaces of the substrate with each other can be omitted, so that the process efficiency can be improved.

Further, in the digitizer according to the second embodiment and the method of fabricating the same, the first and second electrodes include an upper electrode layer and a lower electrode layer, respectively, and the upper electrode layer surrounds the exposed entire surface of the lower electrode layer. Accordingly, the upper electrode layer can protect the lower electrode layer, and can prevent the lower electrode layer from being damaged, thereby improving the electrical characteristic of the digitizer. In addition, the upper electrode layer of each of the first and second electrodes is formed through a printing process or a deposition process. In other words, the forming process can be simplified and the fabrication cost can be saved.

A digitizer according to the third embodiment will be described with reference to FIG. 17. In the following description of the digitizer according to the third embodiment, the details of structures and the elements the same as or similar to those of the digitizer according to the first or second embodiment described above will be omitted, and the same reference numerals will be assigned to the same elements.

Figure 17:
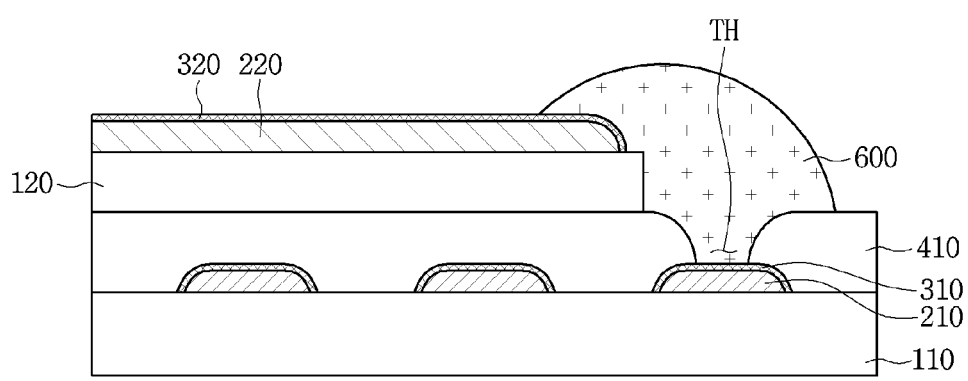
FIG. 17 is a sectional view showing a digitizer according to the third embodiment, which is taken along line A-A' of FIG. 1.

Referring to FIG. 17, the digitizer according to the third embodiment may further include a second substrate 120 provided on the first substrate 110. The first substrate 110 or the second substrate 120 may include glass or plastic. In this case, the first substrate 110 or the second substrate 120 may include PET or PI.

The first substrate 110 may be provided thereon with the first electrode 210 and the first insulating layer 410 including the through hole TH to expose a portion of the first electrode 210. In addition, the second electrode 220 is formed on the second substrate 120. The second substrate 120 may be provided on the first insulating layer 410, and a connection part 600 to connect the second electrode 220 with the first electrode 210 may be provided.

The connection part 600 may include a conductive paste. For example, the conductive paste may include an Ag paste. The connection part 600 formed of the conductive paste makes contact with the second electrode 220 while making contact with the first electrode 210 through the through hole formed in the first insulating layer 410.

Figure 18:
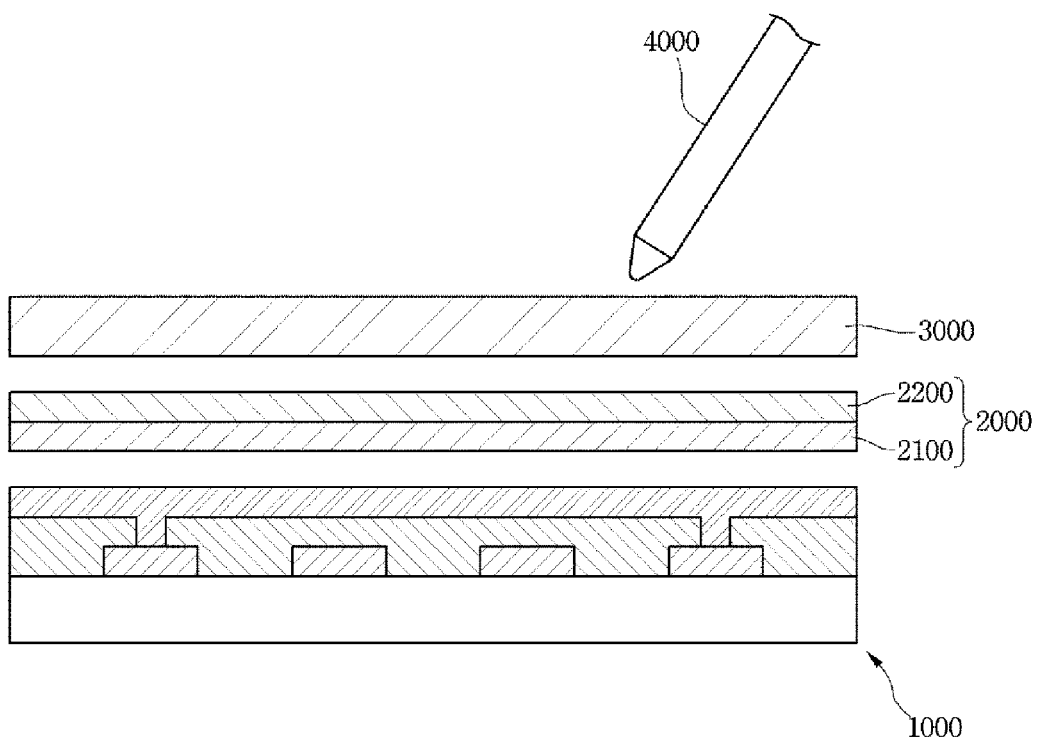
FIG. 18 is a sectional view showing a display device employing the digitizer according to the embodiment.

FIG. 18 is a sectional view showing a display device employing the digitizer according to the embodiment. The display device according to the embodiment includes a digitizer 1000, an LCD module 2000, and a touch sensor 3000.

The LCD module 2000 may include a backlight 2100 including a light source and a liquid crystal panel 2200. In addition, the touch sensor 3000 may include sensor electrodes, such as a sensing electrode and a wire electrode, to sense a touch.

As described above, when a touch object 4000, such as a pen, touches on the display device, that is, the touch sensor 3000, a signal generated from a resonance circuit included in the touch object 4000 may be recognized by the touch sensor 3000 to detect the position of the digitizer pen.

The embodiment provides a digitizer that can be easily fabricated with an improved electrical characteristic.

According to the embodiment, there is provided a digitizer including a first substrate, a first electrode on the first substrate, a first insulating layer on the first electrode, and a second electrode on the first insulating layer. The first insulating layer is formed therein with a through hole to expose the first electrode, and the first and second electrodes make contact with each other through the through hole.

As described above, the digitizer according to the embodiment can be easily manufactured, so that the process efficient can be improved.

According to the related art, a process of forming a through hole in a polyimide substrate is required in order to connect the first and second electrodes with each other after forming first and second electrodes on both surfaces of the polyimide substrate by patterning copper layers plated on both surfaces of the polyimide substrate.

Accordingly, according to the related art, a digitizer is fabricated using an FPCB scheme to form the first and second electrodes on the both surfaces. However, according the scheme of the related art, the realizing of a large-size digitizer is difficult. In addition, the process of forming the through hole is required so that the process efficiency may be degraded, and a substrate such as the polyimide substrate is required so that the process cost may be increased.

The digitizer according to the embodiment may be fabricated by using a substrate including PET, forming the first and second electrodes on one surface of the substrate, and selectively printing the insulating layer to form a through hole in the insulating layer in order to connect the first and second electrodes with each other.

According to the digitizer of the embodiment, both of the first and second electrodes may be formed on one surface, and the substrate including PET is used, so that a large-size digitizer can be realized and the process cost can be reduced. In addition, the insulating layer is selectively printed to form a through hole to connect the first and second electrodes with each other. Accordingly, the process of forming the through hole can be omitted, so that the process efficiency can be improved.

The first and second electrodes are realized on one surface of the substrate, so that functional layers including a shielding layer and a ground electrode may be further formed on an opposite surface of the substrate. In particular, the shielding layer may be formed by directly printing and curing a shielding material on the opposite surface of the PET substrate. Accordingly, the shielding material electrode sheet may be integrated with a shielding sheet. When comparing with the case of forming a PET sheet on a conventional polyimide substrate, and printing and curing the shielding material on the PET sheet, the process cost can be reduced, and the process efficiency can be improved.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

When a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A digitizer comprising:
a first substrate;
a first electrode on the first substrate;
a first insulating layer on the first electrode; and
a second electrode on the first insulating layer,
wherein the first and second electrodes are provided in directions crossing each other,
wherein the first electrode is extended in a first direction,
wherein the second electrode is extended in a second direction,
wherein the first electrode includes a plurality of unit electrodes,
wherein the plurality of unit electrodes includes a first unit electrode, a second unit electrode, and a third unit electrode, the second unit electrode being provided between the first unit electrode and the third unit electrode,
wherein the first unit electrode, the second unit electrode, and the third unit electrode are spaced from each other,
wherein the first insulating layer is formed therein with a plurality of through holes to expose the first electrode,
wherein the plurality of through holes include a first through hole exposing the first unit electrode at a location in which the second electrode crosses the first unit electrode; and a second through hole exposing the third unit electrode at a location in which the second electrode crosses the third unit electrode,
wherein a loop-shape is formed by connecting the first unit electrode to the second electrode through the first through hole and connecting the second electrode to the third unit electrode through the second through hole, and
wherein the plurality of through holes are not provided on the second unit electrode between the first through hole and the second through hole.

2. The digitizer of claim 1, wherein the first and second electrodes comprise at least one of metals comprising gold (Au), silver (Ag), copper (Cu), molybdenum (Mo), nickel (Ni), and chromium (Cr).

3. The digitizer of claim 1, wherein a metallic layer is provided on at least one of the first and second electrodes.

4. The digitizer of claim 3, wherein the metallic layer includes conductive ink or conductive paste.

5. The digitizer of claim 4, wherein the conductive ink or the conductive paste includes a conductive particle, and the conductive particle includes at least one of metals comprising nickel (Ni), copper (Cu), and chromium (Cr).

6. The digitizer of claim 3, wherein the metallic layer includes a metallic oxide layer.

7. The digitizer of claim 6, wherein the metallic oxide layer includes a copper oxide layer or a silver oxide layer.

8. The digitizer of claim 3, wherein the metallic layer is provided on an entire surface of at least one of the first and second electrodes.

9. The digitizer of claim 3, wherein the metallic layer includes a first metallic layer on the first electrode and a second metallic layer on the second electrode, the first metallic layer is provided on an entire surface of the first electrode, and the second metallic layer is provided on an entire surface of the second electrode.

10. The digitizer of claim 3, wherein the metallic layer has a thickness in a range of 1 µm to 10 µm.

11. The digitizer of claim 3, wherein at least one of the first and second electrodes includes a material different from a material constituting the metallic layer.

12. The digitizer of claim 3, wherein at least one of the first and second electrodes includes a material corresponding to a material constituting the metallic layer.

13. The digitizer of claim 1, further comprising a second insulating layer on the second electrode.

14. The digitizer of claim 1, further comprising a shielding layer on the first substrate.

15. The digitizer of claim 1, further comprising a ground electrode on the first substrate.

16. The digitizer of claim 1, wherein at least one of the first and second electrodes has a thickness in a range of 9 µm to 50 µm.

17. The digitizer of claim 1, further comprising a second substrate on the first insulating layer, wherein the second electrode is provided on the second substrate, and the digitizer further comprises a connection part to connect the first and second electrodes with each other through the through hole.

18. The digitizer of claim 17, wherein the connection part includes silver paste.

19. The digitizer of claim 17, wherein at least one of the first and second substrates includes polyethylene terephthalate (PET) or polyimide (PI).

20. The digitizer of claim 1, wherein at least one of the first and second electrodes has a curved surface.

* * * * *